US011404893B2

(12) United States Patent
Kazuno (10) Patent No.: US 11,404,893 B2
(45) Date of Patent: Aug. 2, 2022

(54) VEHICLE POWER SUPPLY CONTROL SYSTEM, VEHICLE POWER SUPPLY CONTROL METHOD, AND STORAGE MEDIUM

(71) Applicant: HONDA MOTOR CO., LTD., Tokyo (JP)

(72) Inventor: Shuichi Kazuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/991,085

(22) Filed: Aug. 12, 2020

(65) Prior Publication Data
US 2021/0057927 A1 Feb. 25, 2021

(30) Foreign Application Priority Data
Aug. 20, 2019 (JP) .............................. JP2019-150141

(51) Int. Cl.
*H02J 7/00* (2006.01)
*B60L 58/13* (2019.01)

(52) U.S. Cl.
CPC ........ *H02J 7/0049* (2020.01); *H02J 7/00034* (2020.01); *H02J 7/00036* (2020.01); *B60L 58/13* (2019.02)

(58) Field of Classification Search
CPC ..................................................... B60L 58/13
See application file for complete search history.

(56) References Cited

U.S. PATENT DOCUMENTS

| 9,368,984 B2* | 6/2016 | Aronov ................ H02J 7/0036 |
| 9,702,304 B1* | 7/2017 | Gaither ..................... F02D 9/02 |
| 11,031,785 B1* | 6/2021 | Erokhovets ............... H02J 9/06 |
| 2010/0174417 A1* | 7/2010 | Iida ..................... H01M 10/425 |
| | | 700/295 |
| 2015/0077054 A1* | 3/2015 | Uyeki .................... G06Q 50/06 |
| | | 320/109 |

(Continued)

FOREIGN PATENT DOCUMENTS

| JP | 04-029532 | 1/1992 |
| JP | 2011-239202 | 11/2011 |

(Continued)

OTHER PUBLICATIONS

Japanese Office Action for Japanese Patent Application No. 2019-150141 dated Mar. 15, 2022.

(Continued)

*Primary Examiner* — Drew A Dunn
*Assistant Examiner* — Tynese V McDaniel
(74) *Attorney, Agent, or Firm* — Amin, Turocy & Watson, LLP (57) ABSTRACT

A vehicle power supply control system includes a communicator configured to receive an emergency notification for notifying that an emergency situation has occurred and a controller configured to control charging and discharging of a secondary battery that supplies electric power to an electric motor for outputting a travel driving force of a vehicle. The controller is configured to perform control for extending an electric power supply range in the secondary battery in a case where the communicator has received the emergency notification.

4 Claims, 5 Drawing Sheets

(56) References Cited

U.S. PATENT DOCUMENTS

| | | | | |
|---|---|---|---|---|
| 2015/0329008 A1* | 11/2015 | Karlson | ................. | B60L 58/15 |
| | | | | 701/22 |
| 2018/0154778 A1* | 6/2018 | Ota | ...................... | H02J 7/0068 |
| 2018/0351385 A1* | 12/2018 | Takashita | ............ | H02J 13/0075 |
| 2019/0143841 A1* | 5/2019 | Aronov | .................... | H02J 3/32 |
| | | | | 429/61 |
| 2020/0238849 A1* | 7/2020 | Kusada | ................. | B60K 6/445 |
| 2021/0075252 A1* | 3/2021 | Caamano | ................ | H02J 3/004 |

FOREIGN PATENT DOCUMENTS

| | | |
|---|---|---|
| JP | 2012-235541 | 11/2012 |
| JP | 2015-067200 | 4/2015 |
| JP | 2017-073915 | 4/2017 |
| JP | 2018-093604 | 6/2018 |
| WO | WO-2016176064 A1 * 11/2016 | ............. G05B 15/02 |

OTHER PUBLICATIONS

Japanese Notice of Allowance for Japanese Patent Application No. 2019-150141 dated May 31, 2022.

* cited by examiner

VEHICLE POWER SUPPLY CONTROL SYSTEM, VEHICLE POWER SUPPLY CONTROL METHOD, AND STORAGE MEDIUM

CROSS-REFERENCE TO RELATED APPLICATION

Priority is claimed on Japanese Patent Application No. 2019-150141, filed Aug. 20, 2019, the content of which is incorporated herein by reference.

BACKGROUND

Field of the Invention

The present invention relates to a vehicle power supply control system, a vehicle power supply control method, and a storage medium.

Description of Related Art

In recent years, development of vehicles such as an electric vehicle (EV) and a hybrid electric vehicle (HEV), each of which performs traveling using an electric motor driven with at least electric power supplied by a battery (a secondary battery), has progressed.

Conventionally, for example, technology for using a charged battery as an emergency power supply during an emergency such as a power failure or a natural disaster has been disclosed (see, for example, Japanese Unexamined Patent Application, First Publication No. H4-029532 and Japanese Unexamined Patent Application, First Publication No. 2011-239202).

However, in the related art, an efficient operation method when a battery mounted in a vehicle is used as an emergency power supply has not been sufficiently studied.

SUMMARY

The present invention has been made on the basis of recognition of the above-described problems and an objective of the present invention is to provide a vehicle power supply control system, a vehicle power supply control method, and a storage medium capable of efficiently using a battery mounted in a vehicle as an emergency power supply.

A vehicle power supply control system, a vehicle power supply control method, and a storage medium according to the present invention adopt the following configurations.

(1): According to an aspect of the present invention, there is provided a vehicle power supply control system including: a communicator configured to receive an emergency notification for notifying that an emergency situation has occurred; and a controller configured to control charging and discharging of a secondary battery that supplies electric power to an electric motor for outputting a travel driving force of a vehicle, wherein the controller is configured to perform control for extending an electric power supply range in the secondary battery in a case where hen the communicator has received the emergency notification.

(2): In the above-described aspect (1), the controller is configured to perform control to decrease a lower limit value of a range in which the secondary battery can be discharge the electric power.

(3): In the above-described aspect (1), the controller is configured to: confirm a state of charge of the secondary battery in a case where the communicator has received the emergency notification; and in a case where the state of charge is not a state of full charge, extend the electric power supply range in the secondary battery and operate an internal combustion engine of the vehicle to charge the secondary battery.

(4): In the above-described aspect (3), the controller is configured to perform control to increase an upper limit value of a range in which the secondary battery can be charged.

(5): According to an aspect of the present invention, there is provided a vehicle power supply control method using a computer including: performing communication for receiving an emergency notification for notifying that an emergency situation has occurred; controlling charging and discharging of a secondary battery that supplies electric power to an electric motor for outputting a travel driving force of a vehicle; and performing control for extending an electric power supply range in the secondary battery in a case where the emergency notification has been received.

(6): According to an aspect of the present invention, there is provided a computer-readable non-transitory storage medium storing a program for causing a computer to: perform communication for receiving an emergency notification for notifying that an emergency situation has occurred; control charging and discharging of a secondary battery that supplies electric power to an electric motor for outputting a travel driving force of a vehicle; and perform control for extending an electric power supply range in the secondary battery in a case where the emergency notification has been received.

According to the above-described aspects (1) to (6), it is possible to efficiently use a battery mounted in a vehicle as an emergency power supply.

DETAILED DESCRIPTION OF THE INVENTION

Embodiments of a vehicle power supply control system, a vehicle power supply control method, and a storage medium of the present invention will be described below with reference to the drawings. In the following description, an example in which the vehicle power supply control system of the present invention is adopted in a hybrid electric vehicle (HEV) (hereinafter simply referred to as a "vehicle") will be described.

[Configuration of Vehicle]

Figure 1:
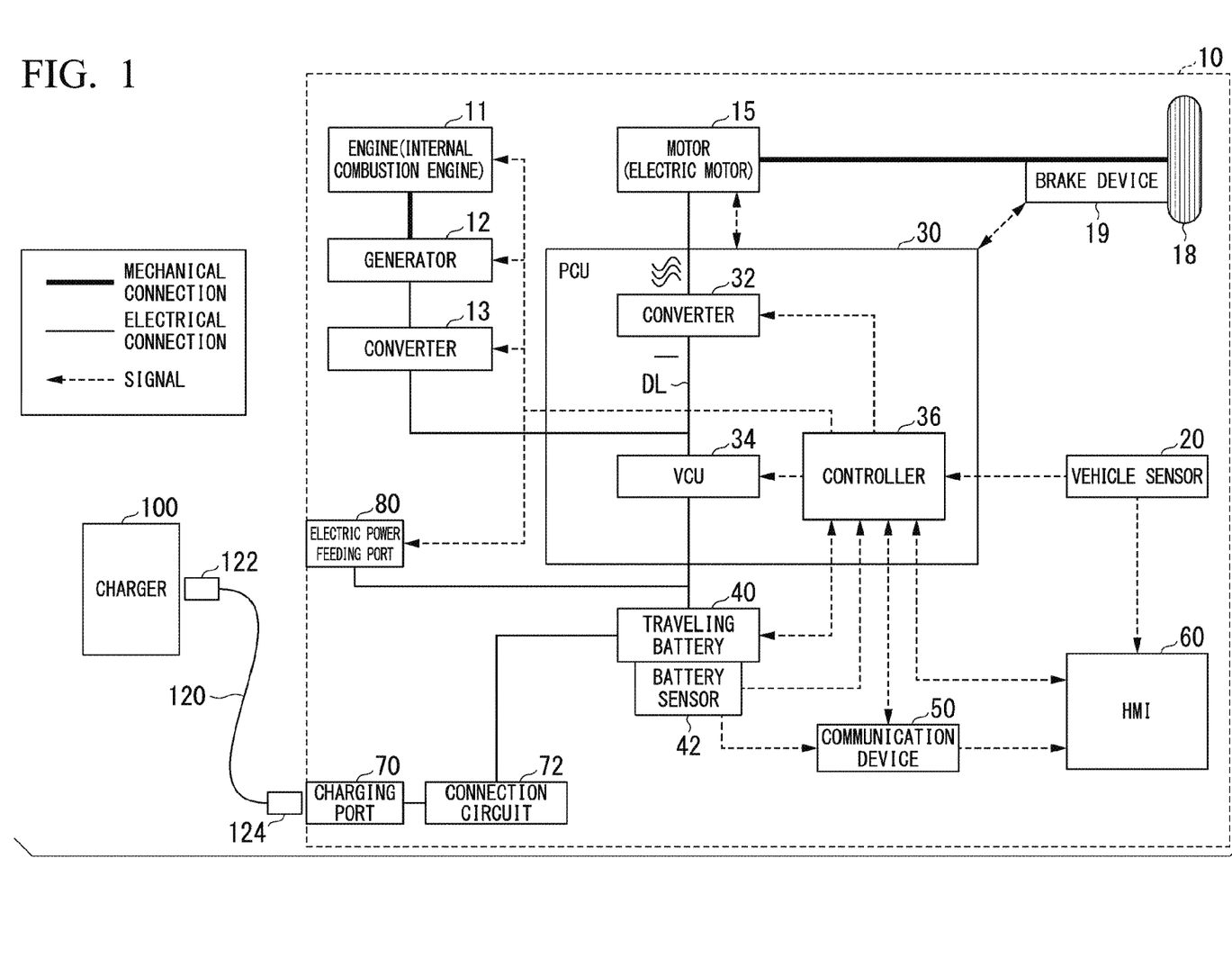
FIG. 1 is a diagram showing an example of a configuration of a vehicle in which a vehicle power supply control system according to an embodiment is adopted.

FIG. 1 is a diagram showing an example of a configuration of a vehicle 10 in which the vehicle power supply control system according to the embodiment is adopted. The vehicle 10 shown in FIG. 1 is a hybrid electric vehicle that performs traveling by an electric motor driven with electric power supplied in accordance with an operation of an internal combustion engine operated by fuel or electric power supplied from a traveling battery (a secondary battery). For example, the vehicle 10 includes all electric vehicles, each of which performs traveling by an electric motor driven with electric power supplied from the operation of the internal combustion engine or the traveling battery, such as a saddle-type two-wheeled vehicle, a three-wheeled vehicle (including a two front-wheeled and one rear-wheeled vehicle in addition to a one front-wheeled and two rear-wheeled vehicle), and an assisted bicycle as well as a four-wheeled vehicle.

The vehicle 10 shown in FIG. 1 includes, for example, an engine 11, a generator 12, a converter 13, a motor 15, drive wheels 18, a brake device 19, a vehicle sensor 20, a power control unit (PCU) 30, a traveling battery 40, a battery sensor 42 such as a voltage sensor, a current sensor, or a temperature sensor, a communication device 50, a human machine interface (HMI) 60 including a display device, a charging port 70, a connection circuit 72, and an electric power feeding port 80.

The engine 11 is, for example, an internal combustion engine such as a diesel engine or a gasoline engine. The engine 11 operates (rotates) using the fuel stored in a fuel tank (not shown) of the vehicle 10. Rotating motive power of the engine 11 is transferred to the generator 12.

The generator 12 generates electric power by rotating with the rotating motive power of the engine 11 as a motive power source. The generator 12 outputs the generated electric power to the converter 13.

The converter 13 is, for example, a direct current (DC)-DC converter. The converter 13 converts the electric power output by the generator 12 into electric power for driving the motor 15 and outputs the electric power to a DC link DL. In other words, the converter 13 performs conversion into electric power similar to electric power to which the voltage control unit (VCU) 34 to be described below boosts electric power supplied from the traveling battery 40 and outputs the electric power to the DC link DL.

The motor 15 is, for example, a three-phase alternating current (AC) electric motor. A rotor of the motor 15 is connected to the drive wheels 18. The motor 15 is driven with electric power supplied from the converter 13 (in other words, supplied by the engine 11) or electric power supplied from an electric power storage (not shown) provided in the traveling battery 40 and causes rotating motive power to be transferred to the drive wheels 18. The motor 15 generates electric power using kinetic energy of the vehicle 10 when the vehicle 10 decelerates.

The brake device 19 includes, for example, a brake caliper, a cylinder that transfers hydraulic pressure to the brake caliper, and an electric motor that generates hydraulic pressure in the cylinder. The brake device 19 may include a mechanism that transfers hydraulic pressure generated by a user (a driver) of the vehicle 10 operating a brake pedal (not shown) to the cylinder via a master cylinder as a backup. The brake device 19 is not limited to the above-described configuration and may be an electronically controlled hydraulic brake device that transfers the hydraulic pressure of the master cylinder to the cylinder.

The vehicle sensor 20 includes, for example, an accelerator opening sensor, a vehicle speed sensor, and a brake depression amount sensor. The accelerator opening sensor is attached to the accelerator pedal, detects an amount of operation of the accelerator pedal by the driver, and outputs the detected amount of operation as an accelerator opening to a controller 36 provided in the PCU 30 to be described below. The vehicle speed sensor includes, for example, a wheel speed sensor and a speed calculator attached to each wheel of the vehicle 10 and combines wheel speeds detected by the wheel speed sensors to derive the speed of the vehicle 10 (a vehicle speed) and output the derived speed to the controller 36 and the HMI 60. The brake depression amount sensor is attached to the brake pedal, detects the amount of operation of the brake pedal by the driver, and outputs the detected amount of operation as an amount of brake depression to the controller 36.

The PCU 30 includes, for example, a converter 32, a voltage control unit (VCU) 34, and the controller 36. In FIG. 1, a configuration of these components integrated as the PCU 30 is only an example and these components may be disposed separately in the vehicle 10.

The converter 32 is, for example, an AC-direct current (DC) converter. A DC side terminal of the converter 32 is connected to the DC link DL. The traveling battery 40 is connected to the DC link DL via the VCU 34. The converter 32 converts an AC current generated by the motor 15 into a DC current and outputs the DC current to the DC link DL.

The VCU 34 is, for example, a DC-DC converter. The VCU 34 boosts electric power supplied from the traveling battery 40 and outputs the boosted electric power to the DC link DL.

The controller 36 includes, for example, a motor controller, a brake controller, a battery and VCU controller, and an electric power supply controller. The motor controller, the brake controller, the battery and VCU controller, and the electric power supply controller may be replaced with separate control devices, for example, control devices such as a motor electronic control unit (ECU), a brake ECU, a battery ECU, and an electric power supply control ECU.

Each of the controller 36 and the motor controller, the brake controller, the battery and VCU controller, and the electric power supply controller provided in the controller 36 is implemented by a hardware processor such as a central processing unit (CPU) executing a program (software). Some or all of these components may be implemented by hardware (a circuit unit including circuitry) such as a large-scale integration (LSI), an application specific integrated circuit (ASIC), a field-programmable gate array (FPGA), or a graphics processing unit (GPU) or may be implemented by software and hardware in cooperation. Some or all of functions of these components may be implemented by a dedicated LSI. The program may be pre-stored in a storage device (a storage device including a non-transitory storage medium) such as a hard disk drive (HDD) or a flash memory provided in the vehicle 10 or may be stored in a removable storage medium (a non-transitory storage medium) such as a DVD or a CD-ROM and installed in the HDD or the flash memory provided in the vehicle 10 when the storage medium is mounted on a drive device provided in the vehicle 10.

The controller 36 controls the driving of the motor 15 on the basis of an output from the accelerator opening sensor provided in the vehicle sensor 20 in the motor controller. The controller 36 controls the brake device 19 on the basis of an output from the brake depression amount sensor provided in the vehicle sensor 20 in the brake controller. For example, the controller 36 calculates a state of charge (SOC) of the traveling battery 40 on the basis of an output from the battery sensor 42 to be described below connected to the traveling battery 40 in the battery and VCU controller and outputs the calculated SOC to the VCU 34 and the HMI 60. The controller 36 may output vehicle speed information output by the vehicle sensor 20 to the HMI 60. The VCU 34 causes a voltage of the DC link DL to be increased in accordance with an instruction from the battery and VCU controller.

The controller 36 switches a supply source of the electric power that is supplied to the motor 15 on the basis of a travel mode of the vehicle 10 in the electric power supply controller. For example, when the vehicle 10 travels in a travel mode in which the vehicle 10 travels with electric power supplied in accordance with the operation of the engine 11 (hereinafter referred to as an engine travel mode), the controller 36 causes the engine 11 to be operated in the electric power supply controller and switches a supply source of electric power supplied to the motor 15 (output to the DC link DL) to the converter 13 of the engine 11 side. For example, when the vehicle 10 travels in a travel mode in which the vehicle 10 travels with electric power supplied from the traveling battery 40 (hereinafter referred to as a battery travel mode), the controller 36 switches a supply source of electric power supplied to the motor 15 (output to the DC link DL) to the VCU 34 of the traveling battery 40 side without operating the engine 11 in the electric power supply controller.

The controller 36 switches a supply destination of the electric power stored in the traveling battery 40 in the electric power supply controller. Although the controller 36 causes the electric power supply controller to supply the motor 15 with the electric power supplied in accordance with the operation of the engine 11 or the electric power supplied from the traveling battery 40 as described above, for example, when the vehicle 10 travels, the controller 36 causes the electric power supply controller to supply the traveling battery 40 with electric power supplied in accordance with an operation of the engine 11 as electric power for charging by operating the engine 11, for example, when the communication device 50 to be described below has received an emergency notification. At this time, the controller 36 may be configured to confirm an SOC as a current state of charge of the traveling battery 40, cause the engine 11 to be operated when the confirmed state of the SOC is a state in which it is not possible to immediately use the electric power of the traveling battery 40 for the emergency in accordance with the emergency notification received by the communication device 50 to be described below (for example, when the confirmed state is not a state of full charge), and use the electric power of the traveling battery 40 for the emergency after the traveling battery 40 is charged. The controller 36 or the electric power supply controller provided in the controller 36 is an example of a "controller" in the claims. Details of the operation related to the switching of the electric power supply destination in the electric power supply controller of the controller 36 will be described below.

For example, the traveling battery 40 includes a secondary battery such as a lithium-ion battery that can be iteratively charged and discharged. An example in which the secondary battery constituting the traveling battery 40 is a capacitor such as an electric double layer capacitor, a composite battery in which a secondary battery and a capacitor are combined, or the like in addition to a lead storage battery, a nickel-hydride battery, a sodium ion battery, or the like is also conceivable. In the present invention, the configuration of the secondary battery in the traveling battery 40 is not particularly specified. The traveling battery 40 stores electric power introduced from a charger 100 outside the vehicle 10 and is discharged for traveling of the vehicle 10. The traveling battery 40 can also store electric power generated by the operation of the engine 11. In this case, the traveling battery 40 stores electric power generated by the operation of the engine 11 and output via the DC link DL and the VCU 34 as in the case in which the traveling battery 40 stores electric power generated by the motor 15 and output via the DC link DL and the VCU 34 when the vehicle 10 decelerates.

The battery sensor 42 includes, for example, an electric current sensor, a voltage sensor, and a temperature sensor. The battery sensor 42 detects an electric current of the secondary battery constituting the traveling battery 40 using the electric current sensor, detects a voltage of the secondary battery using the voltage sensor, and detects a temperature of the secondary battery using the temperature sensor. The battery sensor 42 outputs information such as a value of the detected electric current, a value of the detected voltage, and the detected temperature of the secondary battery to the controller 36.

The communication device 50 includes a wireless module for connecting to a cellular network or a Wi-Fi (registered trademark) network. The communication device 50 may include a wireless module for using Bluetooth (registered trademark) or the like. For example, the communication device 50 transmits and receives various types of information related to the vehicle 10 to and from a server device or the like on a network (not shown) that manages the traveling of the vehicle 10 and the state of the traveling battery 40 through communication of the wireless module. The communication device 50 also receives an emergency notification or the like through communication of the wireless module. The emergency notification is, for example, a notification for notifying that an emergency situation (for example, a power failure or a natural disaster such as a typhoon, a tsunami, or an earthquake) has occurred (a so-called emergency call) issued from a government or a public office. The emergency notification includes, for example, an emergency notification issued from a server device or the like on a network (not shown) through which various types of information related to the vehicle 10 are transmitted and received. The network (not shown) is, for example, a communication network for wireless communication including the Internet, a wide area network (WAN), a local area network (LAN), a provider device, a radio base station, and the like. The emergency notification includes an emergency notification acquired by the communication device 50 from information of the emergency notification received by a terminal device such as a smartphone or a tablet terminal owned by a user U of the vehicle 10 such as a driver, for example, using Bluetooth (registered trademark) or the like. The communication device 50 is an example of a "communicator" in the claims. In the present invention, a configuration and a mechanism of a signal of the emergency notification received by the communication device 50 (for example, the mechanism of the emergency notification packet) and the like are not specified.

For example, the HMI 60 presents various types of information to the user of the vehicle 10 such as the driver and receives an input operation by the user. The HMI 60 is, for example, a so-called touch panel in which a display device such as a liquid crystal display (LCD) and an input device that detects an input operation are combined. The HMI 60 may include various types of display units other than the display device, a speaker, a buzzer, a switch other than the input device, a key, and the like. For example, the HMI 60 may share the display device or the input device with an in-vehicle navigation device or the like.

The charging port 70 is a mechanism for charging the traveling battery 40 (the secondary battery). The charging port 70 is provided oriented toward outside of a vehicle body of the vehicle 10. The charging port 70 is connected to the charger 100 via a charging cable 120. The charging cable 120 includes a first plug 122 and a second plug 124. The first plug 122 is connected to the charger 100 and the second plug 124 is connected to the charging port 70. Electricity supplied from the charger 100 is input (supplied) to the charging port 70 via the charging cable 120.

The charging cable 120 includes a signal cable attached to an electric power cable. The signal cable mediates communication between the vehicle 10 and the charger 100. Therefore, an electric power connector for connecting the electric power cable and a signal connector for connecting the signal cable are provided in each of the first plug 122 and the second plug 124.

The connection circuit 72 is provided between the charging port 70 and the traveling battery 40. The connection circuit 72 transfers an electric current introduced from the charger 100 via the charging port 70, for example, a DC current, as an electric current to be supplied to the traveling battery 40. The connection circuit 72 outputs, for example, a DC current to the traveling battery 40, and causes the secondary battery to store electric power (to be charged therewith).

The electric power feeding port 80 feeds electric power to the outside of the vehicle 10. As a terminal of the electric power feeding port 80, for example, an electric power supply accessory socket (a so-called cigar socket) installed in the interior of the vehicle 10, a universal serial bus (USB) terminal, or the like is conceivable. The terminal of the electric power feeding port 80 may be, for example, an electrical outlet of a commercial power supply for operating a household electrical appliance or a personal computer, or the like. The electric power feeding port 80 feeds electric power (a voltage) specified according to the shape of each terminal, in other words, electric power (a voltage) that matches the specifications of equipment connected to the terminal. Thereby, for example, when the terminal of the electric power feeding port 80 is a USB terminal, it is possible to feed electric power for charging a terminal device such as a smartphone or a tablet terminal owned by a user of the vehicle 10 (an occupant such as a driver).

[Example of Supply of Electric Power in Vehicle 10]

Figure 2:
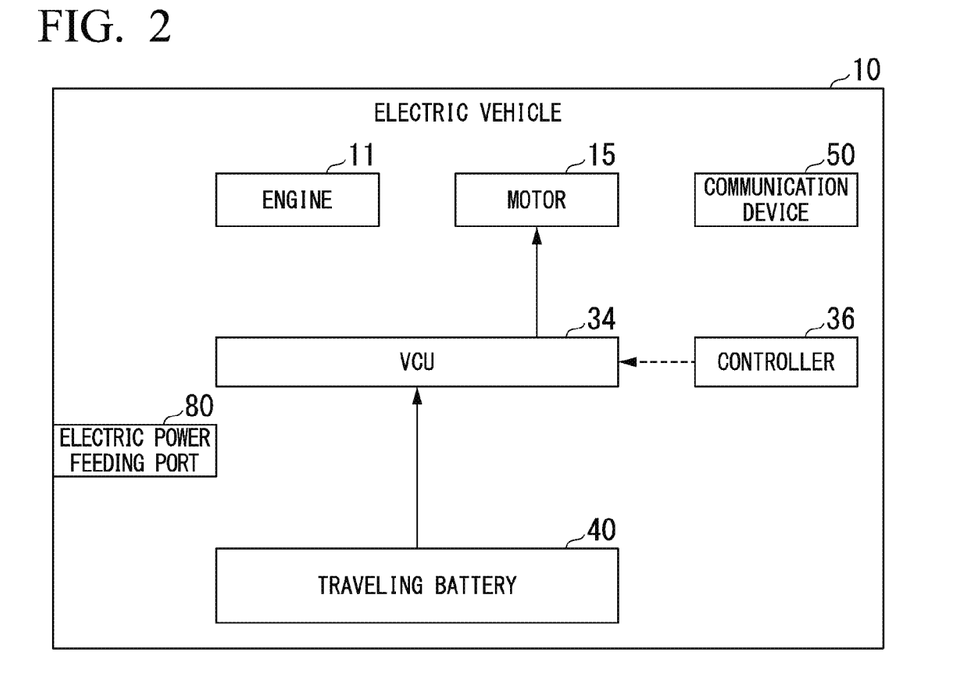
FIG. 2 is a diagram showing an example of an electric power supply path when a vehicle travels.
Figure 3:
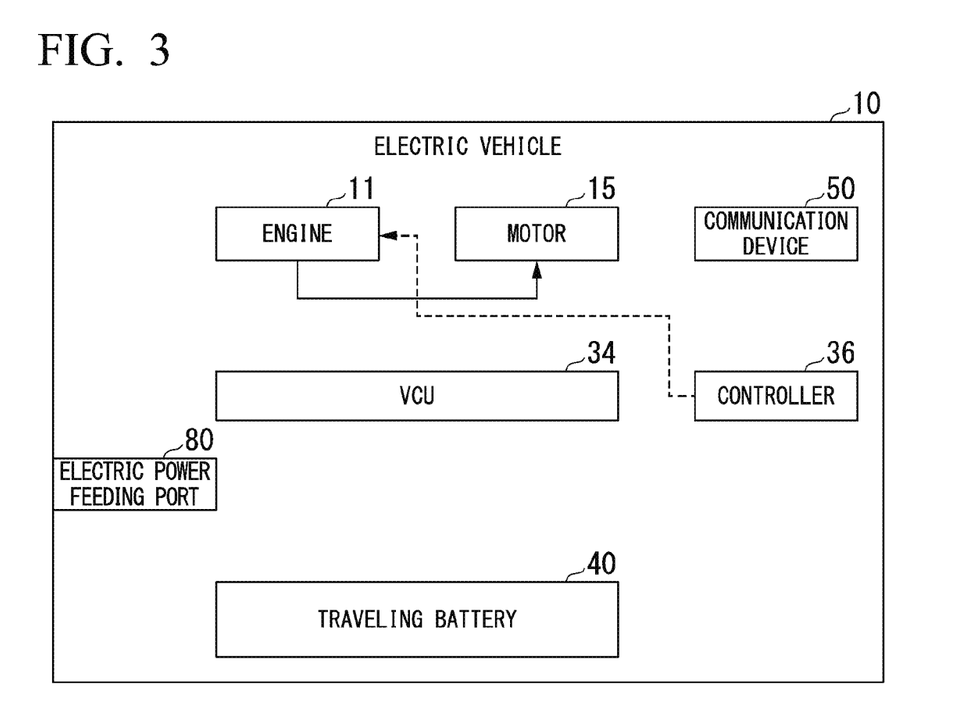
FIG. 3 is a diagram showing another example of the electric power supply path when the vehicle travels.
Figure 4:
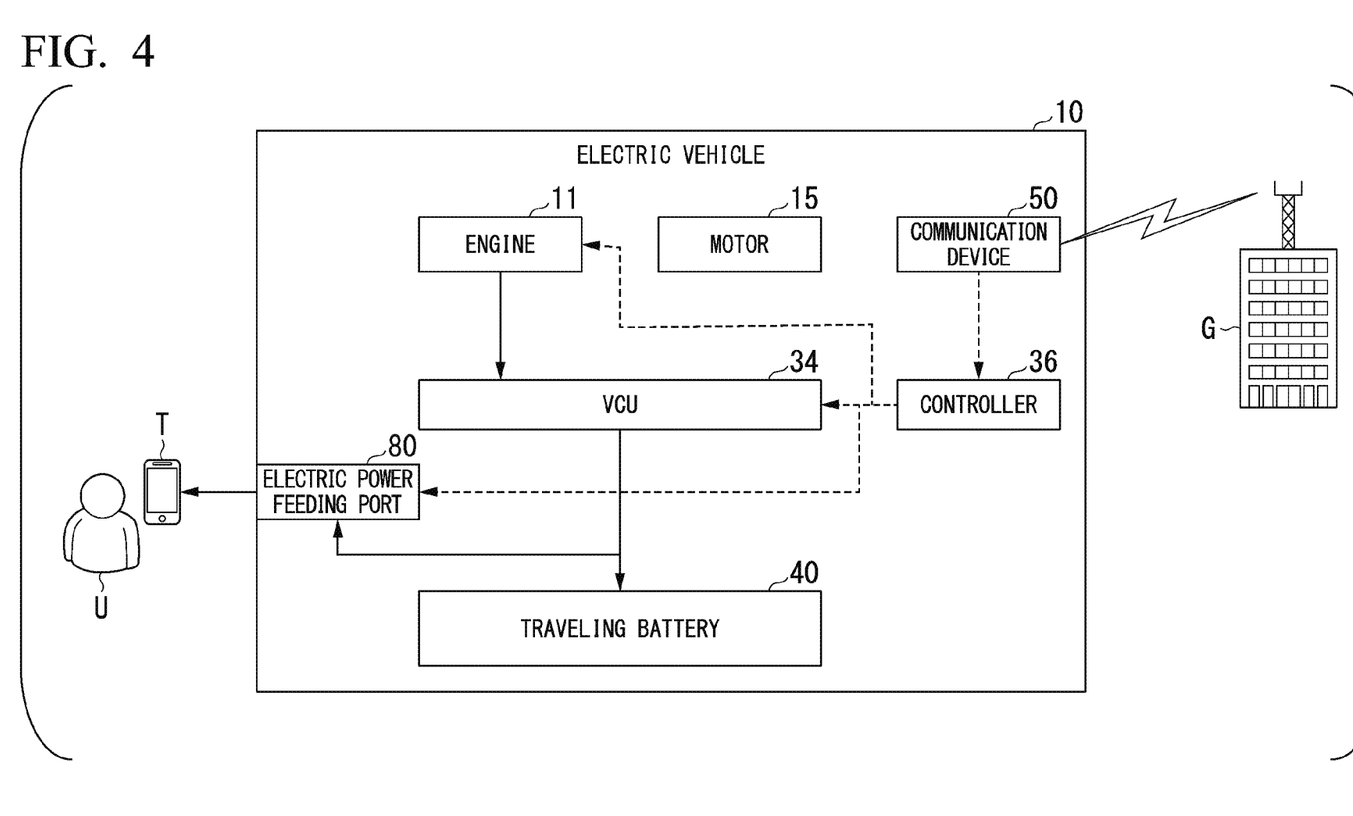
FIG. 4 is a diagram showing an example of an electric power supply path of the vehicle when an emergency notification has been received.

Next, an example of electric power supply in the vehicle 10 in which the vehicle power supply control system is adopted will be described. FIG. 2 is a diagram showing an example of an electric power supply path when the vehicle 10 travels. FIG. 3 is a diagram showing another example of the electric power supply path when the vehicle 10 travels. FIG. 4 is a diagram showing an example of an electric power supply path of the vehicle 10 when an emergency notification has been received. In FIG. 2, the electric power supply path when the vehicle 10 travels in a battery travel mode is shown. In FIG. 3, the electric power supply path when the vehicle 10 travels in an engine travel mode is shown. In FIG. 4, the electric power supply path when the communication device 50 provided in the vehicle 10 has received an emergency notification is shown. In FIGS. 2 to 4, for ease of description, only components constituting or related to the vehicle power supply control system in the configuration of the vehicle 10 shown in FIG. 1 are shown. More specifically, the engine 11, the motor 15, the VCU 34, the controller 36, the traveling battery 40, the communication device 50, and the electric power feeding port 80 are shown. However, the generator 12, the converter 13, the DC link DL, and the converter 32 among the components constituting or related to the vehicle power supply control system are omitted from FIGS. 2 to 4.

First, the electric power supply path when the vehicle 10 travels in the battery travel mode will be described with reference to FIG. 2. In the battery travel mode, as shown in FIG. 2, the electric power supplied from the traveling battery 40 is boosted by the VCU 34 in accordance with control of the controller 36 and output to the motor 15 via the DC link DL and the converter 32. Thereby, the motor 15 rotates in accordance with the electric power output by the converter 32 and the vehicle 10 travels.

Next, the electric power supply path when the vehicle 10 travels in the engine travel mode will be described with reference to FIG. 3. In the engine travel mode, as shown in FIG. 3, the generator 12 generates electric power through rotating motive power of the engine 11 that is operating in accordance with control from the controller 36 and the electric power converted by the converter 13 is output to the motor 15 via the DC link DL and the converter 32. Thereby, the motor 15 rotates in accordance with the electric power output by the converter 32 and the vehicle 10 travels.

In this manner, the controller 36 switches a supply source of the electric power supplied to the motor 15 on the basis of the travel mode of the vehicle 10. Switching of the supply source of the electric power supplied to the motor 15 based on the travel mode of the vehicle 10 in the controller 36 is a normal operation in the vehicle 10. Accordingly, a detailed description of the normal operation of the vehicle 10 will be omitted.

Next, an electric power supply path when the traveling battery 40 is charged with electric power generated by the operation of the engine 11 when the communication device 50 has received an emergency notification will be described with reference to FIG. 4. For example, when the communication device 50 has received an emergency notification issued by a government G, the communication device 50 outputs information indicating the reception of the emergency notification to the controller 36. Thereby, the controller 36 controls each of the engine 11 and the VCU 34 (together with other components) so that the traveling battery 40 is charged with the electric power generated by the operation of the engine 11. In this case, in the vehicle 10, as shown in FIG. 4, electric power generated by the generator 12 according to rotating motive power of the engine 11 that has been operated and converted by the converter 13 is supplied to the VCU 34 via the DC link DL. In the vehicle 10, as shown in FIG. 4, the electric power supplied from the DC link DL is converted by the VCU 34 and supplied to the traveling battery 40. Thereby, the traveling battery 40 stores the electric power converted by the VCU 34 in the secondary battery. In the vehicle 10, as shown in FIG. 4, the electric power converted by the VCU 34 is supplied from the electric power feeding port 80 to the outside of the vehicle 10. Thereby, for example, the user U of the vehicle 10 such as the driver connects the terminal device T such as a smartphone or a tablet terminal owned by the user U to the electric power feeding port 80, so that it is possible to charge the terminal device T with the electric power fed by the electric power feeding port 80.

Although the traveling battery 40 is charged with the electric power converted by the VCU 34 and the electric power is supplied from the electric power feeding port 80 as shown in FIG. 4, charging of the traveling battery 40 with the electric power converted by the VCU 34 and feeding of the electric power from the electric power feeding port 80 are not necessarily limited to the same period. For example, after the traveling battery 40 is charged with the electric power converted by the VCU 34, the electric power supplied by discharging the traveling battery 40 may be supplied from the electric power feeding port 80 to the outside of the vehicle 10.

In this manner, when the communication device 50 has received an emergency notification, the controller 36 can feed the electric power stored in the traveling battery 40 mounted in the vehicle 10 from the electric power feeding port 80 to the outside of the vehicle 10. In other words, the controller 36 can cause the traveling battery 40 mounted in the vehicle 10 to be used as an emergency power supply when the emergency notification has been received.

Charging or discharging for traveling is not performed using all the capacity of the traveling battery mounted in a general electric vehicle in the normal use state. This is because it is conceivable to prolong the life of the traveling battery by performing control for curbing the degradation of a state of health (SOH) of the traveling battery mounted in the vehicle 10 (curbing the progress of deterioration). However, a method in which the electric power supplied by the traveling battery 40 can be used for as long as possible so that the traveling battery 40 is used as an emergency power supply when an emergency notification has been received may also be preferable. Thus, the controller 36 extends a range in which the traveling battery 40 supplies electric power. In other words, the controller 36 extends a usable range of capacity in which discharging or charging of electric power is enabled in the traveling battery 40.

Figure 5:
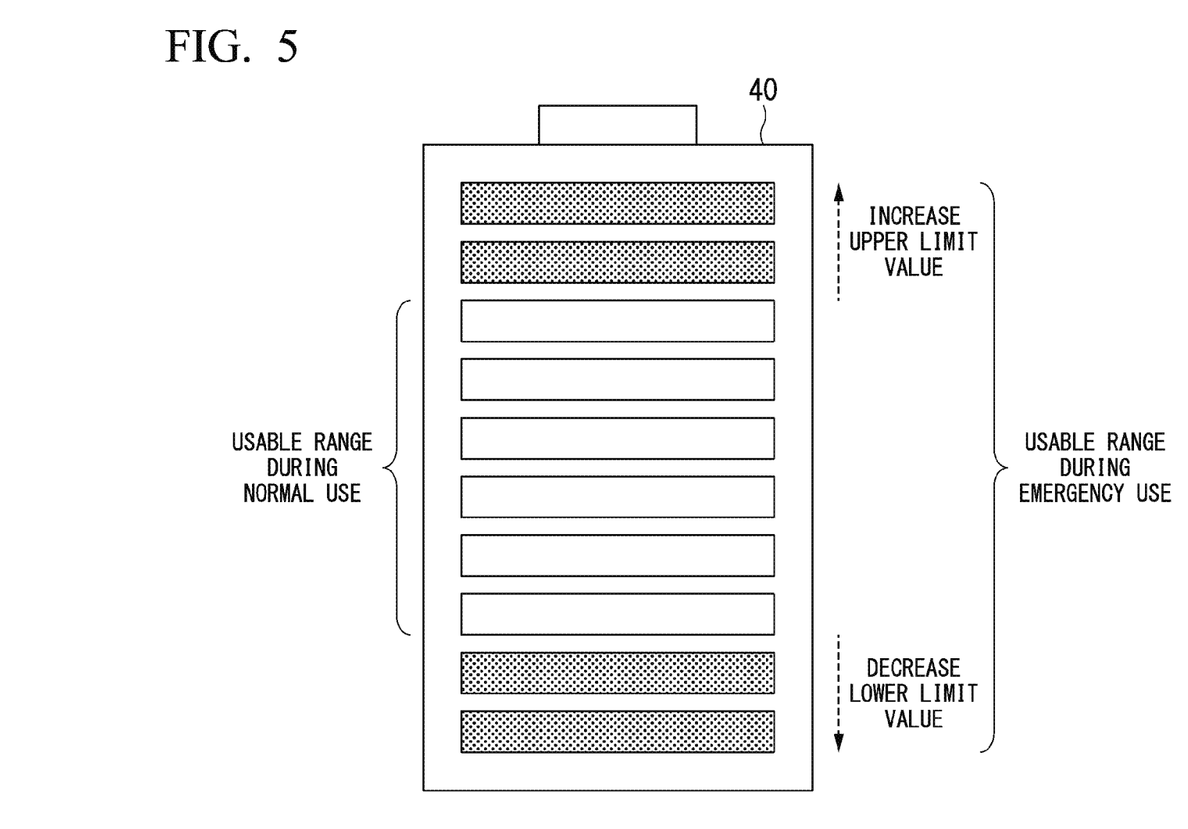
FIG. 5 is a diagram schematically showing an example in which an electric power supply range in a secondary battery is extended when an emergency notification has been received.

FIG. 5 is a diagram schematically showing an example in which an electric power supply range is extended in the traveling battery 40 (the secondary battery) when an emergency notification has been received. In FIG. 5, a difference between a range of capacity that can be used in a normal use state and a range of capacity that can be used when an emergency notification has been received with respect to the entire capacity of the traveling battery 40 is schematically shown.

In the normal use state of the traveling battery 40 in the vehicle 10, as shown in a "usable range during normal use" in FIG. 5, an upper limit value and a lower limit value having a margin in the range of capacity that can be used during charging or discharging are set and the traveling battery 40 is charged or discharged with electric power within a range between the upper limit value and the lower limit value. On the other hand, when the emergency notification has been received, the range of capacity that can be used for charging or discharging the electric power in the traveling battery 40 is extended by changing the upper limit value or the lower limit value set in the normal use state as shown in the "usable range during emergency use" in FIG. 5. In FIG. 5, a state in which the usable range during the emergency use is extended by making a change so that the lower limit value that can be used in charging or discharging set in the normal use state is decreased and further making a change so that the upper limit value that can be used in charging or discharging set in the normal use state is increased is shown. The upper limit value or the lower limit value for the traveling battery 40 in the controller 36 may be set with respect to a battery management unit (BMU) (not shown) for controlling charging or discharging of a secondary battery provided in the traveling battery 40.

The upper limit value and the lower limit value set by the controller 36 to extend the usable range during emergency use may not necessarily be maximum values (for example, upper limit value=100% and lower limit value=0%). This is because a rapid change in electric power supplied from a certain point depending on characteristics of the secondary battery constituting the traveling battery 40 is conceivable. For example, this is because a case in which the voltage rapidly drops from a certain point and it becomes impossible to secure a voltage for use as an emergency power supply if the traveling battery 40 is continuously discharged (electric power is continuously supplied) is conceivable. For example, this is because a case in which the efficiency of charging rapidly decreases from a certain point if the traveling battery 40 is charged with electric power and a process of maximizing an SOC (so-called full charge) is time-consuming is conceivable. In other words, this is because a case in which a proportion of fuel consumed to operate the engine 11 may deteriorate with respect to a proportion of electric power with which the traveling battery 40 is charged and the efficiency of charging may decrease is conceivable.

[Control During Emergency Use of Traveling Battery 40]

Figure 6:
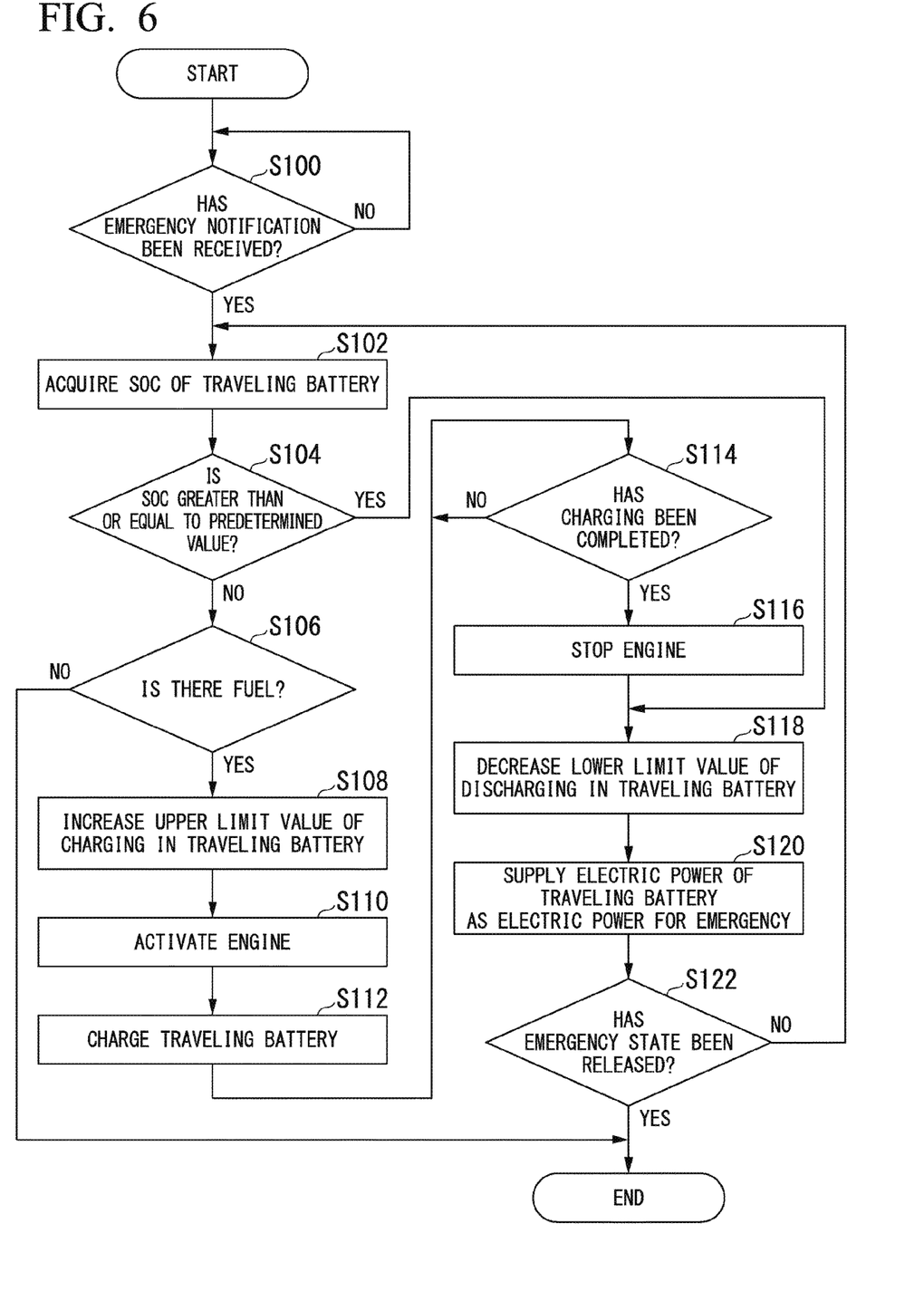
FIG. 6 is a flowchart showing an example of a flow of a process to be executed by the vehicle power supply control system when an emergency notification has been received.

Next, an example of a flow of a process using the traveling battery 40 as an emergency power supply in the vehicle 10 in which the vehicle power supply control system is adopted will be described. FIG. 6 is a flowchart showing an example of a flow of a process to be executed in the vehicle power supply control system when an emergency notification has been received. In FIG. 6, an example of a process to be executed by the controller 36 or the electric power supply controller provided in the controller 36 so that electric power of the traveling battery 40 can be used for an emergency (can be used as an emergency power supply) is shown. In the following description, it is assumed that the controller 36 executes the process of the present flowchart. The process of the present flowchart is iteratively executed at predetermined time intervals regardless of whether or not the vehicle 10 is traveling. However, when the vehicle 10 is traveling and when the vehicle 10 is stopped (parked), the predetermined time interval at which the process is iteratively executed, i.e., a period in which the process of the present flowchart is iterated, may be different.

The controller 36 confirms whether or not the communication device 50 has received an emergency notification (whether or not information indicating that the communication device 50 has received the emergency notification has been output) (step S100). When it is confirmed that the communication device 50 has not received the emergency notification in step S100, the controller 36 iterates step S100 and waits for the communication device 50 to receive the emergency notification.

On the other hand, when it is confirmed that the communication device 50 has received the emergency notification in step S100, the controller 36 acquires an SOC of the traveling battery 40 (step S102). At this time, in the controller 36, the battery and VCU controller may calculate the SOC on the basis of an output from the battery sensor 42 as described above.

Next, the controller 36 confirms whether or not the acquired SOC is greater than or equal to a predetermined value (step S104). Here, the predetermined value of the SOC is a threshold value of the SOC preset to determine whether or not the electric power of the traveling battery 40 can be immediately used for an emergency. When it is confirmed that the acquired SOC is greater than or equal to the predetermined value in step S104, in other words, when it is determined that sufficient electric power, which can be immediately used for an emergency, is stored in the traveling battery 40, the controller 36 moves the process to step S118.

On the other hand, when it is confirmed that the acquired SOC is not greater than or equal to the predetermined value in step S104, in other words, when it is determined that sufficient electric power, which can be immediately used for an emergency, is not stored in the traveling battery 40, the controller 36 confirms whether or not there is fuel in a fuel tank (not shown) of the vehicle 10 (step S106). When it is confirmed that there is no fuel in the fuel tank of the vehicle 10 in step S106, the controller 36 ends the process of the present flowchart. In this case, the traveling battery 40 cannot be used as an emergency power supply. This is because sufficient electric power, which can be used for an emergency, is not stored in the traveling battery 40 and there is no fuel for charging the traveling battery 40.

On the other hand, when it is confirmed that there is fuel in the fuel tank of the vehicle 10 in step S106, the controller 36 increases the upper limit value of charging in the traveling battery 40 (step S108). That is, the controller 36 makes a change so that the upper limit value of the usable range of capacity that can be used for charging the traveling battery 40 is increased and sets the increased upper limit value. Thereby, the traveling battery 40 is configured to store a larger amount of electric power than in the normal use state of the vehicle 10.

Next, the controller 36 activates (operates) the engine 11 (step S110). The controller 36 causes the traveling battery 40 to be charged (step S112). At this time, the controller 36 controls the generator 12 so that electric power is generated using rotating motive power of the engine 11 operated in step S110 as a motive power source. The controller 36 controls the converter 13 so that electric power generated and output by the generator 12 is converted into electric power with which the traveling battery 40 is charged and the converted electric power is output the electric power to the DC link DL. The controller 36 controls the VCU 34 so that the traveling battery 40 is charged with the electric power output to the DC link DL by the converter 13.

Subsequently, the controller 36 confirms whether or not the charging of the traveling battery 40 has been completed (step S114). At this time, the controller 36 acquires the current SOC of the traveling battery 40 and confirms whether or not the acquired SOC is greater than or equal to a predetermined value as in steps S102 and S104. The predetermined value of the SOC here is a value indicating that the traveling battery 40 has been charged (fully charged) to the upper limit value of the usable range of capacity set in step S108. When it is confirmed that charging of the traveling battery 40 has not been completed in step S114, the controller 36 iterates step S114 and waits for the traveling battery 40 to be fully charged.

On the other hand, when it is confirmed that the traveling battery 40 has been completely charged in step S114, the controller 36 causes the engine 11 to be stopped (step S116).

Next, when it is confirmed that the SOC acquired in step S104 is equal to or higher than the predetermined value or after the engine 11 is stopped in step S116, the controller 36 decreases the lower limit value of the discharging in the traveling battery 40 (step S118). That is, the controller 36 makes a change so that the lower limit value of the usable range of usable capacity in discharging (supply of electric power) of the traveling battery 40 is decreased and sets the decreased lower limit value. Thereby, the traveling battery 40 can supply more electric power than in the normal usage state of the vehicle 10.

The controller 36 enables the electric power of the traveling battery 40 to be supplied as electric power for an emergency (step S120). At this time, the controller 36 performs control so that electric power supplied by discharging the traveling battery 40 is fed from the electric power feeding port 80 to the outside of the vehicle 10. Accordingly, a user who receives the supply of electric power by the vehicle 10 can use equipment by connecting the equipment to be used to the terminal of the electric power feeding port 80.

Subsequently, the controller 36 confirms whether or not the emergency state has been released (step S122). As a method of confirming whether or not the emergency state has been released in the controller 36, for example, a confirmation method according to whether or not the communication device 50 has received an emergency notification indicating that the emergency state has been released and has output information indicating that the emergency notification has been received is conceivable. As a method in which the controller 36 confirms whether or not the emergency state has been released, for example, a method in which the controller 36 causes the display device constituting the HMI 60 to display a message for asking about whether the emergency state has been released and display a button for prompting the user to input whether the emergency state is continuing or has been released or the like and performs confirmation by acquiring information of the button operated by the user of the vehicle 10 through the input device constituting the HMI 60 is also conceivable. When it is confirmed that the emergency state has been released in step S122, the controller 36 ends the process of the present flowchart. At this time, the controller 36 may end the process of the present flowchart after the upper limit value or the lower limit value of the usable range of capacity that can be used for charging or discharging the traveling battery 40 changed (extended) in the processing of step S108 or S118 is changed (returned) to a value of the normal use state of the traveling battery 40 in the vehicle 10.

On the other hand, when it is confirmed that the emergency state has not been released in step S122, the controller 36 returns the process to step S102, iterates charging of the traveling battery 40 by activating (operating) the engine 11 in accordance with the acquired SOC value, and causes a state in which electric power of the traveling battery 40 can be supplied as the electric power for an emergency to continue, for example, until fuel stored in the fuel tank of the vehicle 10 is exhausted. For example, as in the method of confirming whether or not the emergency state has been released in step S122, the controller 36 may cause a state in which the traveling battery 40 is used as the emergency power supply to continue after confirming whether or not a state in which the electric power of the traveling battery 40 can be supplied as the electric power for an emergency can continue on the basis of the operation of the HMI 60 by the user of the vehicle 10.

As described above, the controller 36 ends the use of the traveling battery 40 as an emergency power supply (the process of the flowchart shown in FIG. 6) due to the exhaustion of fuel stored in the fuel tank of the vehicle 10 or on the basis of an operation of the HMI 60 by the user of the vehicle 10, i.e., in accordance with an instruction of the user of the vehicle 10. However, a state in which the traveling battery 40 can be reused as an emergency power supply, for example, when the fuel tank is refilled with fuel thereafter, is also conceivable. In other words, a case in which the controller 36 causes the state in which the traveling battery 40 is reused as the emergency power supply to be restored after ending the use of the traveling battery 40 as the emergency power supply (including stopping the use thereof) is also conceivable. In the process of the controller 36 in this case, the processing of step S100 in the flowchart shown in FIG. 6 is replaced with a process of receiving an instruction from the user of the vehicle 10. That is, although the controller 36 starts the execution of the process when the communication device 50 receives the emergency notification in step S100 in the flowchart shown in FIG. 6, the controller 36 starts the execution of a process in accordance with an instruction of the user of the vehicle 10 when the state in which the traveling battery 40 is used as the emergency power supply is restored. Because the process of the controller 36 in this case can be easily understood on the basis of the flowchart shown in FIG. 6, detailed description of the process of the controller 36 when the state in which the traveling battery 40 is used as the emergency power supply is restored will be omitted.

As described above, according to the vehicle power supply control system of the embodiment, when the emergency notification has been issued, the electric power of the traveling battery 40 can be supplied as the emergency electric power in the vehicle 10 in which the vehicle power supply control system is adopted. In other words, in the vehicle 10 in which the vehicle power supply control system of the embodiment is adopted, the traveling battery 40 mounted therein can be used as an emergency power supply. Moreover, in the vehicle power supply control system of the embodiment, a range in which the traveling battery 40 supplies electric power is extended by extending the usable range of capacity in which the traveling battery 40 can be discharged and charged with electric power. Thereby, in the vehicle 10 in which the vehicle power supply control system of the embodiment is adopted, the traveling battery 40 mounted therein can be efficiently used as an emergency power supply.

According to the above-described embodiment, the vehicle power supply control system includes the communication device 50 configured to receive an emergency notification for notifying that an emergency situation has occurred; and the controller 36 configured to control charging and discharging of the traveling battery 40 that supplies electric power to the motor 15 for outputting a travel driving force of the vehicle 10, wherein the controller 36 performs control for extending an electric power supply range in the traveling battery 40 in a case where the communication device 50 has received the emergency notification, so that it is possible to efficiently use the traveling battery 40 as the emergency power supply. Thereby, in the vehicle 10 in which the vehicle power supply control system is adopted, the user of the vehicle 10 (including someone other than the user of the vehicle 10) can use the traveling battery 40, for example, as an emergency power supply for a recovery from a power failure or a natural disaster such as a typhoon, a tsunami, or an earthquake, for a long time. The traveling battery 40 mounted in the vehicle 10 in which the vehicle power supply control system is adopted can be used in various situations in which an emergency response needs to be taken such as use for traveling of an emergency vehicle. In other words, in the vehicle 10 in which the vehicle power supply control system is adopted, it is possible to secure electrical energy which is urgently required.

The embodiment described above can be represented as follows.

A vehicle power supply control system including:
a hardware processor; and
a storage device storing a program,
wherein the hardware processor reads and executes the program stored in the storage device to:
perform communication for receiving an emergency notification for notifying that an emergency situation has occurred;

control charging and discharging of a secondary battery that supplies electric power to an electric motor for outputting a travel driving force of a vehicle; and perform control for extending an electric power supply range in the secondary battery in a case where the emergency notification has been received.

In the embodiment, a case in which the vehicle 10 adopting the vehicle power supply control system is a hybrid electric vehicle (HEV) has been described. However, a vehicle equipped with a traveling battery and configured to perform traveling by an electric motor driven with electric power supplied by the traveling battery may also be, for example, a battery electric vehicle (BEV) or the like. Thus, the vehicle power supply control system can also be adopted in such an electric vehicle. In this case, because an internal combustion engine such as an engine is not mounted in an electric vehicle as in a hybrid electric vehicle, it is impossible to supply electric power supplied in accordance with the operation of the engine to a traveling battery for charging, but it is possible to externally feed at least the electric power stored in the current traveling battery mounted therein as emergency electric power. In this case, likewise, it is possible to efficiently use the mounted traveling battery as emergency power supply by extending a range of electric power supply in the current traveling battery (more specifically, making a change so that the lower limit value of the usable range of capacity that can be used in discharging (supply of electric power) is decreased). Because a process of the vehicle power supply control system adopted in the electric vehicle can also be easily understood in a manner similar to that of the process of the vehicle power supply control system adopted in the hybrid electric vehicle in the above-described embodiment, detailed description thereof is omitted.

For example, there is also an electric vehicle such as a fuel cell vehicle (FCV) that performs traveling by an electric motor driven with electric power supplied from a fuel cell. The vehicle power supply control system can also be adopted in a fuel cell vehicle. In this case, instead of supplying the electric power supplied in accordance with the operation of the engine described in the embodiment to the traveling battery to charge the traveling battery, the electric power generated by the fuel cell can be supplied to the traveling battery to be charged. Thereby, it is also possible to externally feed the electric power stored in the traveling battery as emergency electric power in the fuel cell vehicle in which the vehicle power supply control system is adopted. Electric power stored in the traveling battery can also be used as a power supply for activation when the fuel cell is allowed to generate electric power and electric power stored in the traveling battery can be externally fed and therefore can also be used as an activation power supply for a plurality of fuel cells. In this case, likewise, it is possible to efficiently use the mounted traveling battery as an emergency power supply by extending a range of electric power supply in the traveling battery (more specifically, changing the upper limit value or the lower limit value of the usable range of capacity that can be used in charging or discharging). Because a process of the vehicle power supply control system adopted in the fuel cell vehicle can also be easily understood in a manner similar to that of the process of the vehicle power supply control system adopted in the hybrid electric vehicle in the above-described embodiment, detailed description thereof is omitted.

Although modes for carrying out the present invention have been described using embodiments, the present invention is not limited to the embodiments and various modifications and substitutions can also be made without departing from the scope and spirit of the present invention.

What is claimed is:

1. A vehicle power supply control system comprising:
a communicator configured to receive an emergency notification for notifying that an emergency situation has occurred; and
a controller configured to control charging and discharging of a secondary battery that supplies electric power to an electric motor for outputting a travel driving force of a vehicle,
wherein the controller is configured to perform control for extending an electric power supply range in the secondary battery in a case where the communicator has received the emergency notification, and
wherein the controller is configured to:
confirm whether or not a state of charge (SOC) of the secondary battery is greater than or equal to a predetermined value in a case where the communicator has received the emergency notification;
in a case where it is confirmed that the SOC is greater than or equal to the predetermined value, perform control for decreasing a lower limit value of a range in which the secondary battery can discharge the electric power; and
in a case where it is confirmed that the SOC is not greater than or equal to the predetermined value, perform control for increasing an upper limit value of a range in which the secondary battery can be charged, then, charge the secondary battery, and then, perform control for decreasing the lower limit value of the range in which the secondary battery can discharge the electric power.

2. The vehicle power supply control system according to claim 1,
wherein the controller is configured to:
confirm the SOC of the secondary battery in a case where the communicator has received the emergency notification; and
in a case where the state of charge is not a state of full charge, extend the electric power supply range in the secondary battery and operate an internal combustion engine of the vehicle to charge the secondary battery.

3. A vehicle power supply control method using a computer comprising:
performing communication for receiving an emergency notification for notifying that an emergency situation has occurred;
controlling charging and discharging of a secondary battery that supplies electric power to an electric motor for outputting a travel driving force of a vehicle; and
performing control for extending an electric power supply range in the secondary battery in a case where the emergency notification has been received,
wherein the performing of the control for extending the electric power supply range comprises:
confirming whether or not a state of charge (SOC) of the secondary battery is greater than or equal to a predetermined value in a case where the emergency notification has been received;
in a case where it is confirmed that the SOC is greater than or equal to the predetermined value, performing control for decreasing a lower limit value of a range in which the secondary battery can discharge the electric power; and
in a case where it is confirmed that the SOC is not greater than or equal to the predetermined value, performing control for increasing an upper limit value of a range in which the secondary battery can be charged, then, charging the secondary battery, and then, performing control for decreasing the lower limit value of the range in which the secondary battery can discharge the electric power.

4. A computer-readable non-transitory storage medium storing a program for causing a computer to:
perform communication for receiving an emergency notification for notifying that an emergency situation has occurred;
control charging and discharging of a secondary battery that supplies electric power to an electric motor for outputting a travel driving force of a vehicle; and
perform control for extending an electric power supply range in the secondary battery in a case where the emergency notification has been received,
wherein the performing of the control for extending the electric power supply range comprises:
confirming whether or not a state of charge (SOC) of the secondary battery is greater than or equal to a predetermined value in a case where the emergency notification has been received;
in a case where it is confirmed that the SOC is greater than or equal to the predetermined value, performing control for decreasing a lower limit value of a range in which the secondary battery can discharge the electric power; and
in a case where it is confirmed that the SOC is not greater than or equal to the predetermined value, performing control for increasing an upper limit value of a range in which the secondary battery can be charged, then, charging the secondary battery, and then, performing control for decreasing the lower limit value of the range in which the secondary battery can discharge the electric power.

* * * * *